United States Patent
Nau et al.

(10) Patent No.: US 7,511,284 B2
(45) Date of Patent: Mar. 31, 2009

(54) PHOTOSTABILISATION OF FLUORESCENT DYES

(75) Inventors: Werner Nau, Bremen (DE); Jyotirmayee Mohanty, Mumbai (IN)

(73) Assignee: International University Bremen GmbH, Bremen (DE)

(*) Notice: Subject to any disclaimer, the term of this patent is extended or adjusted under 35 U.S.C. 154(b) by 0 days.

(21) Appl. No.: 11/631,628
(22) PCT Filed: Jul. 8, 2005
(86) PCT No.: PCT/EP2005/053274
§ 371 (c)(1), (2), (4) Date: Mar. 19, 2007
(87) PCT Pub. No.: WO2006/005727
PCT Pub. Date: Jan. 19, 2006

(65) Prior Publication Data
US 2008/0023646 A1  Jan. 31, 2008

(30) Foreign Application Priority Data
Jul. 8, 2004 (DE) .............. 10 2004 033 050

(51) Int. Cl.
G01J 1/58 (2006.01)
(52) U.S. Cl. .............. 250/458.1; 250/484.2; 250/486.1
(58) Field of Classification Search .............. 250/458.1, 250/484.2, 486.1; 435/4, 6
See application file for complete search history.

(56) References Cited

U.S. PATENT DOCUMENTS

| 3,731,110 A * | 5/1973 | Dewey, Jr. .................. 359/326 |
| 5,994,143 A | 11/1999 | Bieniarz et al. |
| 6,249,372 B1 * | 6/2001 | Kobayashi et al. .......... 359/326 |
| 2001/0022349 A1 * | 9/2001 | Takahashi .................. 250/582 |

FOREIGN PATENT DOCUMENTS

| DE | 697 20 809 T2 | 4/2004 |
| EP | 1 094 065 B1 | 4/2001 |
| WO | WO 02/24816 A1 | 3/2002 |

OTHER PUBLICATIONS

Cesar Marquez, et al, "Cucurbiturils: Molecular Nanocapsules for Time-Resolved Fluorescence-Based Assays", IEEE Transactions on Nanobioscience, vol. 3, No. 1, Mar. 2004, pp. 39-45.*
Jae Wook Lee, et al, "Cucurbituril Homologues and Derivatives: New Opportunities in Supramolecular Chemistry", Accounts of Chemical Research, vol. 36, No. 8, 2003, pp. 621-630.
Brain D. Wagner, et al, "A Fluorescent Host-Guest Complex of Cucurbituril in Solution: A Molecular Jack O'Lantern", Can. J. Chem./Rev. Can. Chim., vol. 79, No. 7, 2001, pp. 1101-1104.

* cited by examiner

Primary Examiner—David P Porta
Assistant Examiner—Mark R Gaworecki
(74) Attorney, Agent, or Firm—Sughrue Mion, PLLC (57) ABSTRACT

The invention relates to the field of photostabilisers for fluorescent dyes. The invention additionally relates to products containing such photostabilisers.

10 Claims, 3 Drawing Sheets

PHOTOSTABILISATION OF FLUORESCENT DYES

The invention relates to the field of photostabilisers for fluorescent dyes. The invention additionally relates to products containing such photostabilisers.

Fluorescent dyes are organic colouring agents that are able to absorb ultraviolet radiation or visible light and emit it as light of longer wavelength with virtually no time delay (fluorescent). Fluorescent dyes within the scope of this invention are both dye molecules and chromophoric constituents (fluorochromes) of larger molecular units, for example chromophores bound to antibodies or other biomolecules. Such fluorescent dyes are used in many technical fields, for example in day-glow paints, as optical enhancers in dye lasers (laser dyes), but also in a number of analytical methods in chemistry, biochemistry, biology, clinical chemistry and physics. For example, fluorochromes are used in fluorescence analysis and as fluorescent probes for specific labelling in immunology. A good overview of common fluorescent dyes and their fields of use is known to the person skilled in the art from, for example, the Handbook of Fluorescent Probes and Research Chemicals, Richard P. Haugland, Molecular Probes.

Xanthene dyes, in particular the rhodamines and their derivatives, such as, for example, rhodamine 6G, which is the most well known, and derivatives such as rhodamine 101, rhodamine 123, sulforhodamine and fluorescein, have for a long time been used successfully in analytical applications. Rhodamines and fluorescein are distinguished inter alia by a particularly intense fluorescence. A further group of frequently used fluorescent dyes are cyanine dyes. The main field of application of cyanine dyes is photography, where they are used as sensitisers, but also in organic dye lasers, and as fluorescent markers for biomolecules. A third and fourth, likewise important group of frequently used fluorescent dyes are the coumarin and oxazine dyes.

A factor that limits the usability of fluorescent dyes is their photostability. The photostability of fluorescent dyes affects not only the accuracy of single-molecule detection processes (SMD) by laser-induced fluorescence and dye laser chemistry, but virtually all applications of fluorescence spectroscopy, in which high sensitivity or a good signal-to-noise ratio is important. As a result of light-induced chemical change, fluorescent dyes gradually lose their ability to fluoresce; this process is also known as photobleaching. The slower the photobleaching of a fluorescent dye at a given incident light radiation, the greater its photostability. With regard to the theoretical background of photostability, to factors that can affect photostability and to methods of determining the photostability of a fluorescent dye, the person skilled in the art will consult in particular the publication of Eggeling et al., Photostability of Fluorescent Dyes for Single-Molecule Spectroscopy: Mechanisms and Experimental Methods for Estimating Photobleaching in Aqueous Solution, Chapter 10 in Rettig et al., Applied Fluorescence in Chemistry, Biology and Medicine, Springer Verlag, ISBN 3-540-64451-2.

Photobleaching is normally an irreversible process. As a result, fluorescent dyes have only a comparatively short life and are consumed rapidly in analytical applications and in dye lasers. There is therefore a need for agents and processes for improving the photostability of fluorescent dyes.

A number of different substances are conventionally used for the photostabilisation of fluorescent dyes, for example ascorbic acid, cyclooctatetraene, mercaptoethylamine, n-propyl gallate, Mowiol (Hoechst, Germany), Slowfade (Molecular Probes, USA) or ProLong (Molecular Probes, USA). Although it has been possible to achieve an improvement in photostability for some fluorescent dyes, this is often accompanied by an impairment of the photointensity or is found to be inadequate for particularly sensitive applications, especially in the analytical field or for dye lasers.

The object of the invention was, therefore, to remedy the disadvantages of the prior art and, in particular, to provide agents and processes for improving the photostability of conventional fluorescent dyes.

It has now been found that cucurbiturils are able considerably to increase the photostability of conventional fluorescent dyes. The invention therefore teaches the use of a cucurbituril for improving the photostability of a fluorescent dye. To that end, the fluorescent dye to be stabilised is brought into contact with the cucurbituril.

Cucurbiturils are macrocyclic compounds of the general formula (A):

Formula (A)

wherein each R, independently of each other R, can represent: H, alkyl, hydroxy, alkoxy. The basic structure of the cucurbiturils was published for the first time in the publication W. A. Freeman, W. L. Mock and N.-Y. Shih: Cucurbituril, J. Am. Chem. Soc. 103 (1981), p. 7367-7368. In that publication, the name cucurbituril is first proposed for the compound; the substance investigated at that time is today called cucurbit[6]uril. Preparation processes for cucurbiturils are known, for example, from EP 1 094 065 A, wherein the preparation of cucurbit[5]uril, cucurbit[6]uril, cucurbit[7]uril and cucurbit[8]uril in particular is described.

Cucurbiturils were hitherto known for removing dyes from waste water in the textile industry. They are also mentioned incidentally in U.S. Pat. No. 5,994,143 as a covalently bonded, functional constituent of particular polymeric fluorescent dyes, where they are merely said to increase the fluorescence intensity of the fluorescent dye; an influence on the photostability of fluorescent dyes is not taught. It is not possible to draw conclusions as to a possible photostabilising effect, that is to say as to the mean number of cycles of light absorption and emission of fluorescent radiation per dye molecule before the molecule loses its fluorescence, from a change in the fluorescence intensity, that is to say an improved quantum yield of emitted fluorescent radiation per irradiated radiation.

The degree of photostabilisation of a fluorescent dye effected by cucurbiturils is dependent inter alia on the ratio of the size of the cucurbituril to the size of the fluorescent dye. It is to be assumed that cucurbiturils form inclusion compounds with fluorescent dyes. Accordingly, it will be understood that the cucurbituril used for photostabilisation is to be chosen in dependence on the size of the fluorescent dye to be stabilised. A low degree of photostabilisation by a given cucurbituril occurs if the fluorescent dye is too small or too large to be included in the form of a complex by the particular cucurbituril in question. Which cucurbituril brings about the greatest photostabilisation for a given fluorescent dye can readily be determined by the person skilled in the art by means of a few routine tests.

In order to improve the photostability of a fluorescent dye there is preferably used a cucurbituril selected from the group consisting of cucurbit[5]uril, cucurbit[6]uril, cucurbit[7]uril and cucurbit[8]uril or a mixture of two or more of these cucurbiturils. In preliminary tests, these cucurbiturils exhibited the best photostabilisation for conventional fluorescent dyes, in particular for xanthene and cyanine fluorescent dyes.

Within the scope of this invention, particular preference is given to the use of the following cucurbiturils:

cucurbit[5]uril:
a substance having a structure according to formula (B):

Formula (B)

cucurbit[6]uril:
a substance having a structure according to formula (C):

Formula (C)

cucurbit[7]uril:
a substance having a structure according to formula (D):

Formula (D)

cucurbit[8]uril:
a substance having a structure according to formula (A) wherein n=6 and each R=H (formula (E)).

The cucurbiturils according to formulae (B) to (E) exhibit only a slight or no improvement in the photostability of anionic fluorescent dyes, for example fluorescein. The cucurbiturils according to formulae (B) to (E) are therefore preferably not used for improving the photostability of anionic fluorescent dyes. In addition, it is preferred to use cucurbiturils, and in particular the cucurbiturils according to formulae (B) to (E), for improving the photostability of cationic fluorescent dyes.

It is often difficult to obtain cucurbiturils in pure form. Cucurbiturils are usually obtained in the form of mixtures in which one or two cucurbiturils are present in a higher concentration than other cucurbiturils. It has been found, however, that the photostabilisation of a fluorescent dye by a cucurbituril is affected to only a small degree by the presence of another cucurbituril. Accordingly, it is often not necessary to use a pure cucurbituril for improving the photostability of a fluorescent dye; mixtures of two or more cucurbiturils can also be used instead.

Moreover, it is preferred to use mixtures of a plurality of cucurbiturils for improving the photostabilities of a dye mixture containing a plurality of fluorescent dyes, in particular when the sizes of the fluorescent dyes present in the dye mixture differ markedly from one another. In that manner, it is advantageously possible, in a simple manner, simultaneously to provide a good or the best cucurbituril for each fluorescent dye that is to be stabilised in a dye mixture.

The fluorescent dyes for the photostabilisation of which cucurbiturils according to the invention, and in particular the cucurbiturils cucurbit[5]uril, cucurbit[6]uril, cucurbit[7]uril and/or cucurbit[8]uril mentioned above as being preferred, are used are preferably selected from the group consisting of fluorescent dyes having a molecular weight of from 200 to 1000 g/mol., based on the chromophore, xanthene fluorescent dyes, cyanine fluorescent dyes, coumarin fluorescent dyes and oxazine fluorescent dyes or a mixture containing two or more of these dyes. Particular preference is given to the use of cucurbiturils for improving the photostability of xanthene, coumarin, oxazine and/or cyanine fluorescent dyes having a molecular weight of from 200 to 1000 g/mol., again based on the particular chromophore in question.

Particular preference is given to the use of a cucurbituril for improving the photostability of a fluorescent dye selected from the group consisting of BiBuQ, BM-terphenyl, coumarin 2, coumarin 6, coumarin 7, coumarin 30, coumarin 47, coumarin 102, coumarin 120, coumarin 153, coumarin 307, coumarin 334, coumarin 6H, cyanine 3, cyanine 5, DCM, DMQ, DOTCl, DPS, HDITC, HITC, IR 125, IR 140, IR 144+IR 125, oxazine 1, oxazine 9, oxazine 750, PBBO, p-terphenyl, pyridine 1, pyridine 2, QUI, rhodamine 101, rhodamine 110, rhodamine 123, rhodamine 6G, rhodamine 700, rhodamine 800, rhodamine B, tetramethylrhodamine, stilbene 3, styryl 8, styryl 9, styryl 9M, sulforhodamine B, sulforhodamine G and the lactone forms thereof, the degree of protonation and deprotonation of the fluorescent dye being unimportant.

A cucurbituril is preferably used for improving the photostability of the cationic or neutral form of the mentioned fluorescent dyes. Anionic fluorescent dyes have only a low intrinsic affinity for cucurbiturils, so that, under the solution conditions conventional for bioassays, significant photostabilisation frequently does not occur by the addition of a cucurbituril.

Particular preference is given to the use of a cucurbituril (in particular cucurbit[5]uril, cucurbit[6]uril, cucurbit[7]uril and/or cucurbit[8]uril) for improving the photostability of a fluorescent dye wherein the fluorescent dye comprises at least a portion selected from the group consisting of: amino, aminium, ammonium, imino, iminium, imido, enamine, lactam and oxime. A common feature of the fluorescent dyes preferably stabilised by the use of a cucurbituril is that they contain a nitrogen atom that is positively charged at pH 7 and/or that is protonisable in solution. Fluorescent dyes having one or more protonisable nitrogen atoms enter particularly readily into complexes with cucurbiturils and are therefore photostabilised particularly well by cucurbiturils.

In tests carried out hitherto, it has been possible to achieve very good photostabilisation by the use of a cucurbituril for rhodamine fluorescent dyes of the general formula Formula (F)

wherein
  each of the radicals $R_1$, $R_2$, independently of one another and of each other radical, can be selected from H, $C_1$-$C_4$-alkyl, preferably $CH_3$ and particularly preferably $C_2H_5$,
  each radical $R_3$, independently of each other radical, can be selected from H and $C_1$-$C_4$-alkyl, preferably $CH_3$, and
  each radical $R_4$, independently of each other radical, can be selected from H and $C_1$-$C_4$-alkyl, preferably $C_2H_5$,
and also for other salts, the neutral form and the lactone forms of these fluorescent dyes. These uses are therefore preferred according to the invention.

Particularly good photostabilisation by the use of a cucurbituril has been achieved for the fluorescent dyes according to formula (F) rhodamine 6G ($R_1$=H, $R_2$=$C_2H_5$, $R_3$=$CH_3$, $R_4$=$C_2H_5$), rhodamine 123 ($R_1$=$R_2$=$R_3$=H, $R_4$=$C_2H_5$) and tetramethylrhodamine ($R_1$=$R_2$=$CH_3$, $R_3$=$R_4$=H). These uses are particularly preferred according to the invention.

The photostability of the fluorescent dyes according to formula (F), and in particular of the fluorescent dyes just mentioned, could be improved particularly well according to the invention by the use of cucurbit[7]uril.

Very good photostabilisation by the use of a cucurbituril, in particular cucurbit[7]uril, has also been achieved for cyananine fluorescent dyes of the general formula Formula (G)

wherein
  each radical $R_1$, $R_2$, $R_3$, independently of each other radical $R_1$, $R_2$, $R_3$, is selected from H and $C_1$-$C_4$-alkyl, preferably $CH_3$ and $C_2H_5$, and wherein
  n is an integer from 1 to 5, preferably 1 or 2, and for other salts and the neutral form of these fluorescent dyes.

Particularly good photostabilisation has been achieved for the cyanine fluorescent dyes cyanine 3 ($R_1$=$C_2H_5$, $R_2$=$R_3$=$CH_3$, n=1) and cyanine 5 ($R_1$=$C_2H_5$, $R_2$=$R_3$=$CH_3$, n=2), in particular when using cucurbit[7] uril. These uses are therefore likewise particularly preferred according to the invention.

It has also been possible to achieve very good improvements in photostability by the use of a cucurbituril for coumarin dyes of the general formula Formula (H)

wherein each of the radicals $R_1$ to $R_6$, independently of one another, is selected from the group consisting of H, $C_1$-$C_4$-alkyl and is preferably selected from H and $CH_3$. It is possible for the radicals $R_4$ and $R_6$ and the radicals $R_3$ and $R_5$ to form in each case a ring, which can also in each case contain one or more hetero atoms and one or more multiple bonds. An example of a sub-group of fluorescent dyes according to formula (H) is shown hereinbelow in formula (I); the photostabilisation of these fluorescent dyes, in particular by cucurbit[7]uril, is particularly preferred. Particularly good photostabilisation has been achieved with cucurbit[7]uril for the coumarin fluorescent dyes of formula (I), in particular coumarin 102 ($R_1$=H, $R_2$=$CH_3$ in formula (I)) and coumarin 39 ($R_1$=$CH_3$, $R_2$=$CH_3$ in formula (I)); these uses are therefore likewise particularly preferred according to the invention.

Formula (I)

It has also been found that cucurbiturils are able to improve the solubility of a fluorescent dye in aqueous media. Preference is therefore given according to the invention also to the use of a cucurbituril for improving the solubility of a fluorescent dye.

It has additionally been found that fluorescent dyes adsorb less strongly at surfaces in cucurbituril-containing aqueous media. In particular, a fluorescent dye in aqueous solution complexed with a cucurbituril adsorbs less strongly at glass surfaces than without the cucurbituril. Accordingly, the invention teaches the use of a cucurbituril for reducing the adsorption of a fluorescent dye at a surface, in particular at a glass surface.

The improved solubility of a fluorescent dye in combination with a cucurbituril, the reduced adsorption at surfaces and the improved photostability result overall in improved storage stability of the fluorescent dye, in particular in aqueous solutions and in particular in glass containers. The invention therefore also teaches the use of a cucurbituril for improving the storage stability of a fluorescent dye.

In a complex with cucurbituril, the absorbance (extinction coefficient) and the fluorescence quantum yield (intensity) of a number of fluorescent dyes are greater than without the cucurbituril, e.g. for coumarin-102 and for cyanine 5. The invention therefore also teaches the use of a cucurbituril for increasing the absorbance and/or the fluorescence quantum yield.

In addition, cucurbiturils influence the absorption maximum of fluorescent dyes; the nature of the displacement of the fluorescence spectrum depends on the particular fluorescent dye in question and on the particular cucurbituril in question. The invention therefore also provides the use of a cucurbituril for changing the fluorescence spectrum of a fluorescent dye.

It will be understood that the interaction of the cucurbituril with the fluorescent dye is critical for all the above-mentioned uses according to the invention. Accordingly, for all the above-mentioned uses, particular preference is given to the particular combinations of cucurbituril and fluorescent dye mentioned at the beginning. In particular, the cucurbituril and the fluorescent dye are so chosen that the fluorescent dye can be complexed by the cucurbituril. In each of the uses according to the invention, the fluorescent dye preferably has a molecular weight of from 200 to 1000 g/mol., as described at the beginning. Particularly preferred fluorescent dyes for the uses according to the invention are also described in greater detail at the beginning.

In addition, the invention provides a photostabilised dye product containing a fluorescent dye and a cucurbituril in a concentration sufficient for photostabilisation. According to the invention, the cucurbituril is to be chosen in dependence on the dye to be stabilised, as described above. Such dye products are particularly photostable owing to the action of their cucurbituril constituent. The comments made above apply in respect of the choice of a particularly suitable dye and of a particularly suitable cucurbituril.

The dye product contains the florescent dye(s) and the cucurbituril(s) preferably in an aqueous medium, particularly preferably in water. Cucurbiturils can be dissolved particularly readily in aqueous media (in particular in water); in addition, aqueous media are very often used in conventional fluorescence assays.

Preference is given according to the invention to those dye products and uses in which the concentration of the fluorescent dye is at least 100 pM and the concentration of the cucurbituril is at least 1 µM. These minimum concentrations are particularly preferred when the dye product contains the fluorescent dye(s) and the cucurbituril(s) in an aqueous medium, in particular in water. In addition, preference is given to those dye products and uses in which the concentration of the fluorescent dye is not more than 100 µM and the concentration of the cucurbituril is not more than 10 mM.

In particularly preferred embodiments, the dye product according to the invention is a laser dye solution for a dye laser or is a reference solution for microscopic and spectroscopic purposes. For example, commercial UV spectrophotometers contain reference solutions of rhodamine or are corrected spectrally with the aid of rhodamine solutions as standard. Further possible applications are in the field of confocal fluorescence microscopy, where the photostability of fluorescent dyes is particularly important owing to the high laser intensities. Confocal microscopy is used in particular to study biological or biologically relevant samples labelled with fluorescent dyes, so that the addition of a photostabiliser, such as, for example, according to the invention the addition of a cucurbituril, prolongs the time for which the labelled biological samples can be studied. This permits more accurate, more highly resolved measurements, and measurements over prolonged periods for the monitoring of time-dependent processes.

Fluorescence processes are widely used in the field of active ingredient research, in high-throughput screening and in assays, where increased photostability is likewise advantageous, in particular in the case of high-throughput screening by means of confocal fluorescence microscopy, where focused laser light is in turn used in order to reduce the sample amounts. Many applications in confocal microscopy also require reference solutions for calibration and optimisation, in which high photostability of a standard solution of a fluorescent dye is desirable. Accordingly, the invention also provides a dye laser and a spectrometer containing a laser dye solution and a fluorescent dye solution, respectively, of the above-described type according to the invention. Such dye lasers and spectrometers have the advantage over conventional dye lasers and spectrometers of improved photostability of the fluorescent dye solution, so that the fluorescent dye solution has to be replaced less frequently, while the laser power remains the same, and is able to give more stable, reproducible results.

Preferred dye products according to the invention are also those for information technology, in particular a storage medium and a display medium each containing a fluorescent dye and a cucurbituril for improving the photostability of the fluorescent dye. The use of a cucurbituril advantageously permits the optical excitation of fluorescent dyes and the repeated determination of their fluorescence. Cucurbiturils are therefore capable of conferring the necessary repeated readability and the necessary useful life on an optical storage medium containing fluorescent dyes. In addition, when choosing the appropriate dye, the absorbance (the extinction coefficient) and the fluorescence quantum yield (intensity) are increased by the use of a cucurbituril, so that a storage medium according to the invention and a display medium according to the invention require less intensive irradiation to produce a strong luminescence signal. This likewise results in a prolonged useful life as compared with conventional storage media and display media. Storage media based on fluorescence instead of on optical reflection are said to be distinguished in principle by a higher achievable data density, by the possibility of three-dimensional data storage and selective addressing, and such data carriers are referred to among experts as next-generation technology or 21st century technology (http://www.vxm.com/Speed.MassStorage.html; http://www.ifrance.com/shuman/data_storage_technology. htm; http://pubs.acs.org/cen/topstory/8047/8047notw7. html).

The invention accordingly provides an optical storage medium for data storage, the storage medium comprising:

a) a solid carrier and b) a storage layer for recording and reproducing information, wherein the storage layer comprises storage sections and wherein the storage sections contain a fluorescent dye and a cucurbituril in a concentration sufficient for the photostabilisation of the fluorescent dye.

The storage medium realises the advantages which can be achieved with the use of cucurbiturils. In particular, it is possible with the aid of cucurbiturils to provide a storage medium, containing fluorescent dyes, which is readable many times by irradiation with light. The storage medium according to the invention can comprise a plurality of storage layers in order to increase the amount of information that can be stored on the storage medium.

For the inscription of an optical storage medium according to the invention there is provided according to the invention a process comprising the following steps:

a) information to be stored is read in, and b) fluorescent dye and/or cucurbituril is destroyed in storage sections chosen according to the information to be stored, in order to produce an arrangement of storage sections having the ability, according to the information to be stored, to emit a fluorescence signal.

As a result, a pattern of storage sections is produced on the storage medium, the storage sections fluorescing according to the information written on the storage medium. If the cucurbituril in the storage sections is destroyed, and its ability to photostabilise the fluorescent dye in the particular storage section in question is accordingly limited or removed, a pattern of storage sections is produced in which the storage sections fluoresce with varying permanence according to the information written on the storage medium. If the storage medium comprises several layers of storage sections, then the process according to the invention advantageously comprises the step of choosing an associated layer for the writing of information.

For carrying out the process according to the invention there is provided a storage device comprising a) a storage surface having storage sections, the storage sections containing a fluorescent dye and a cucurbituril in particular in a concentration sufficient for the photostabilisation of the fluorescent dye, b) irradiating means for irradiating a chosen storage section with a radiation intensity sufficient to trigger a fluorescence signal.

The storage device according to the invention also realises the above-described advantages which can be achieved with the use of cucurbiturils.

Advantageously, the storage device contains control means for the irradiating means, in order to indicate thereto a chosen storage section corresponding to information to be stored.

The invention additionally provides a display device comprising a) a display surface having display sections, the display sections containing a fluorescent dye and a cucurbituril in a concentration sufficient for the photostabilisation of the fluorescent dye, b) irradiating means for irradiating a chosen display section with a radiation intensity sufficient to trigger a fluorescence signal, and c) a control device that is in active communication with the irradiating means in order to control the irradiating means in such a manner that display sections are irradiated or are not irradiated according to image information read in by the control device, in order to produce on the display surface a fluorescent image corresponding to the image information.

The display device according to the invention realises the above-described advantages which can be achieved with the use of cucurbiturils.

The display device according to the invention and the storage device according to the invention can contain in particular a dye product according to the invention in each display section or storage section, so that the fluorescent dye(s) in a display and/or storage section is/are photostabilised.

Depending on the application, and in particular in applications in storage and display media as well as in high-throughput screening processes, it can be necessary or advantageous to use solid, that is to say undissolved, but photostabilised fluorescent dyes. According to the invention, the described photostabilisation by means of cucurbituril comprises also fluorescent dye complexes with cucurbituril which are isolated in solid form (e.g. by removal of the solvent), as well as complexes on surfaces by means of surface-fixed or material-bound fluorescent dyes or cucurbiturils.

The invention is described in greater detail hereinbelow by means of some exemplary embodiments and the figures:

EXAMPLE 1

Improvement in the Photostability of Rhodamine 6G

Figure 1:
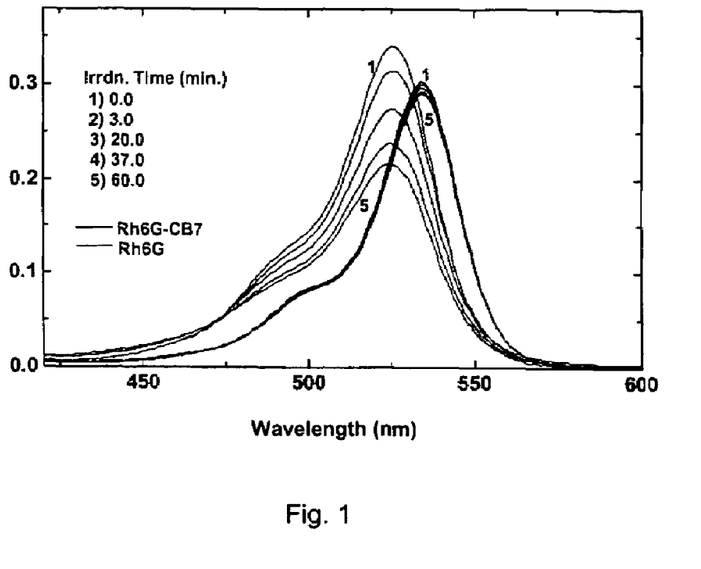

The addition of cucurbituril (mixture of a plurality of cucurbiturils, wherein cucurbit[7]uril (formula (D), also known as CB7) was the predominant species according to mass spectrometry, with cucurbit[5]uril as a detectable impurity), concentration of cucurbit[7]uril 1-2 mM, mixture prepared as described in C. Marquez, F. Huang, W. M. Nau, "Cucurbiturils: Molecular Nanocapsules for Time-Resolved Fluorescence-based Analysis", IEEE Trans. Nanobiosci. 2004, 3, 39-45) to an aqueous solution of rhodamine 6G (1-10 μM) in a quartz cuvette (1 cm×4 cm) increased the photostability of the sample both to laser irradiation with the 2nd harmonic (532 nm) of a Nd-YAG laser (Continuum Surelite III 10 model, 1.3-2.1 kW/cm$^2$) and to daylight (ambient light). The photostabilisation of the fluorescent dye stabilised by cucurbituril (CB7) was monitored by the characteristic visible absorption band with a Varian Cary 50 UV-VIS spectrophotometer, based on a cucurbituril-free, optically adapted (at 532 nm) solution of the fluorescent dye. The UV-Vis spectra were recorded at different irradiation times (FIG. 1), and the decreasing absorption (A) at 532 nm was plotted against the pertinent function $\log([10^A_0-1]/[10^A-1])$. FIG. 1 shows absorption spectra of rhodamine-6G without (red, spectra with maxima on the left) and with (blue, spectra with maxima on the right) cucurbit[7]uril at different, in each case comparable 532-nm laser irradiation times (0 min, 3 min, 20 min, 37 min and 60 min). The slower decrease in the characteristic absorption with cucurbit[7]uril and the displacement of the absorption wavelength are visible. The concentrations with and without cucurbit[7]uril are not identical, but were so chosen that the absorbance at 532 nm was identical at the start of irradiation. The concentration of rhodamine 6G was lower in samples containing cucurbit[7]uril than in samples without cucurbit[7]uril owing to a higher extinction coefficient.

The quantum yield of the photobleaching was determined by means of the initial linear region of the graph (FIG. 2) of the ratio of the gradients $S(D)/S(D+CB7)=\epsilon_D\phi_b(D)/[\epsilon_{D+CB7}\phi_b(D+CB7)]$, wherein $\epsilon_{D+CB7}$ and $\epsilon_D$ are the extinction coefficient of the dye (D) with and without CB7 at the irradiation wavelength of 532 nm.

Figure 2:
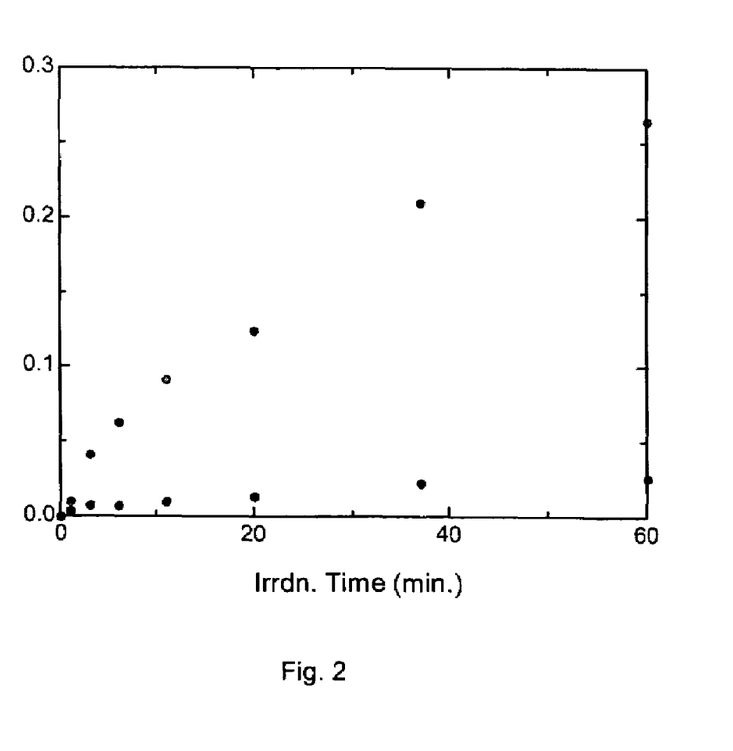

FIG. 2 plots the data according to FIG. 1 for the absorption spectra of rhodamine-6G without (red, data points at the top) and with (blue, data points at the bottom) cucurbit[7]uril according to $\log([10^A_0-1]/[10^A-1])$ against the irradiation time to determine the time-dependent stabilisation factor from the gradient. The chosen stabilisation factor was the ratio of the quantum yields of the photobleaching in the absence and presence of CB7. This gave the results shown in Table 1.

It has been found, for example, that the number of absorption cycles before a molecule of rhodamine 6G decomposes is increased from 0.8 million to 22 million by addition of cucurbit[7]uril (in the form of the above-described CB7 solution). By comparison, the number of corresponding absorption cycles for rhodamine 123, one of the most stable fluorescent dyes, is only 1.6 million. By using cucurbit[7]uril, therefore, the photostability of rhodamine 6G is improved considerably.

Figure 3:
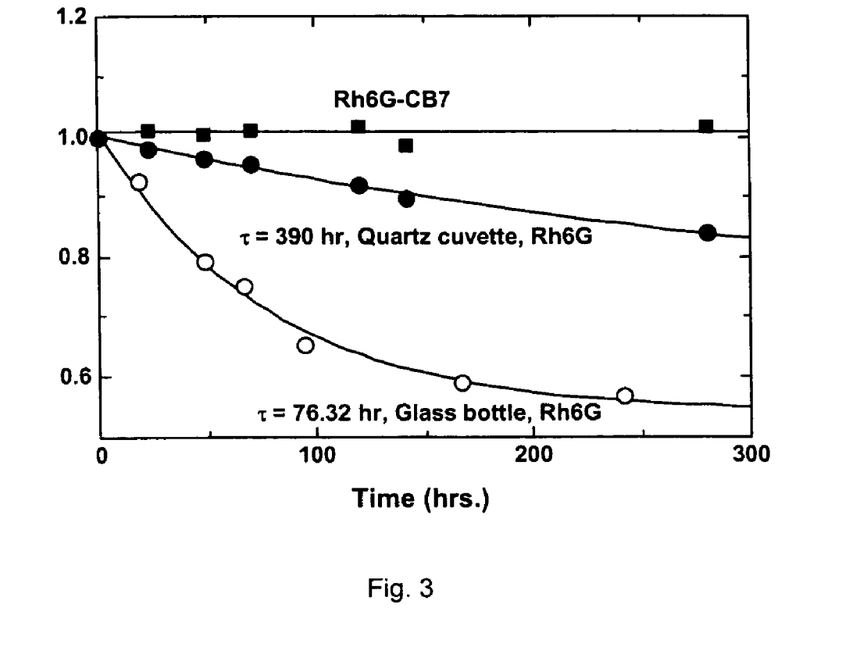

As an alternative, the decrease in the fluorescence intensity of the above-described solutions was determined by observing their fluorescence (Cary Eclipse Fluorometer, Varian) when the solutions were stored in daylight (ambient light). The fluorescence intensity remained unchanged over the observation period for the solution containing cucurbituril, whereas it felt markedly for the cucurbituril-free solution (FIG. 3), with approximate half-lives of about 80 to 390 hours, depending on the sample vessel. FIG. 3 shows the decrease in the fluorescence intensity of rhodamine-6G in daylight under various conditions: a) with cucurbit[7]uril in glass bottles (Rh6G-CB7), b) without cucurbit[7]uril in quartz cuvettes (quartz cuvette, Rh6G) and c) without cucurbit[7]uril in glass bottles (glass bottle, Rh6G). It will be seen that, by using cucurbit[7]uril, the fluorescence intensity of rhodamine-6G hardly decreases at all when exposed to daylight for 300 hours, while the fluorescence intensity in quartz cuvettes falls to 90% of the original value and in a glass bottle to 60% of the original value in the same period of time.

Problems owing to a considerable decrease in the fluorescence intensity of the dye solution in cucurbituril-free, unstabilised solutions are known to the person skilled in the art (Eggeling et al., Photostability of Fluorescent Dyes for Single-Molecule Spectroscopy: Mechanisms and Experimental Methods for Estimating Photobleaching in Aqueous Solution, Chapter 10 in Rettig et al., Applied Fluorescence in Chemistry, Biology and Medicine, Springer Verlag, ISBN 3-540-64451-2). The effect is particularly pronounced when the solutions are monitored in conventional glass bottles instead of in quartz cuvettes, see FIG. 3.

TABLE 1

Quantum yields of the photobleaching and stabilisation factors for rhodamine 6G in the presence of cucurbituril (CB7)*

| Conditions | Stabilisation factor |
| --- | --- |
| without CB7 | =1 (reference) |
| with 1 mM CB7, daylight, screw-top glass bottle | >5000* |
| with 1 mM CB7, daylight, quartz cuvette | >500* |
| with 1 mM CB7, low laser power (1.3 W) | 30* |
| with 1 mM CB7, high laser power (2.1 W) | 7.5* |

*independently of the concentration of CB7 (about 1 and 2 mM) and laser dye (about 3.5 and 7 µM) and laser frequency (1 Hz or 10 Hz)

EXAMPLE 2

Tests on Other Fluorescent Dyes

Figure 4:
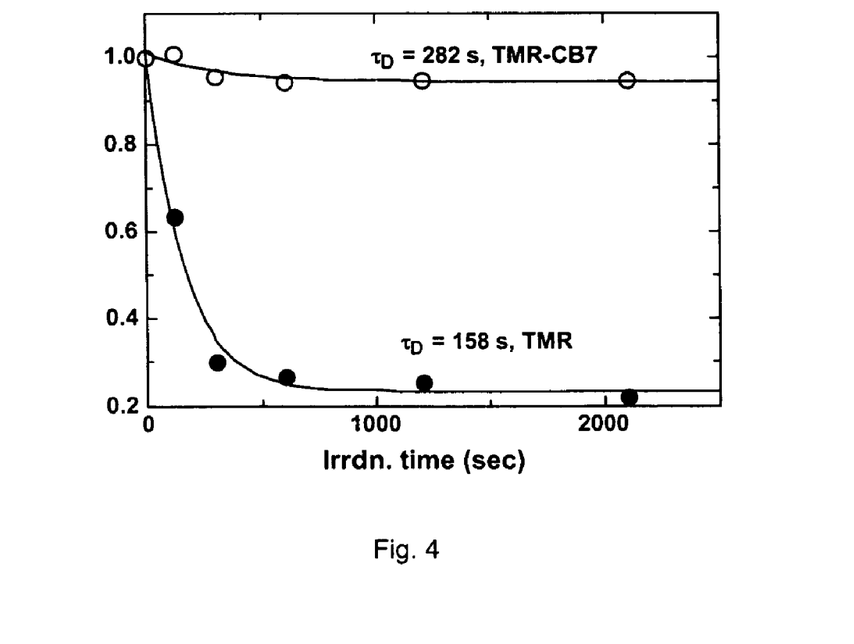

Aqueous solutions of fluorescent dyes (10 nM) with and without cucurbit[7]uril (1 mM) were also studied by fluorescence correlation spectroscopy (FCS) on a confocal microscope (Carl Zeiss LSM 510 Confocor 2), which is used for several applications relevant for biology, biochemistry and spectroscopy. 400 µl of each solution were transferred to an 8-chamber cover glass system and irradiated with the light of a CW laser. The decrease in the count rate, which is directly proportional to the mean fluorescence intensity of the sample, was measured against the irradiation time. FIG. 4 shows the decrease in the count rate for a tetramethylrhodamine (TMR) solution with and without cucurbituril (CB7). Considerable photostabilisation can again be seen, because without cucurbit[7]uril less than 30%, but with cucurbit[7]uril still more than 90% of the count rate is present after 30 minutes. The observed photostabilisation factors are contained in Table 2 (footnotes b, c, d).

TABLE 2

Effect of the addition of CB7 (1 mM) on the brightness ($\epsilon \times \phi_f$) and the photostability of selected fluorescent dyes

| | without CB7 | | with 1 mM CB7 | | Stabilisation |
| --- | --- | --- | --- | --- | --- |
| Fluorescent dye | $\phi_f$ | $\epsilon \times \phi_f$ | $\phi_f$ | $\epsilon \times \phi_f$ | factor |
| Rhodamine 6G | 0.89 | 71218 | 0.883 | 81594 | $30.0^a$ |
| | | | | | $5.4^b$ |
| Rhodamine 123 | 0.83 | 57470 | 0.362 | 24097 | $1.8^c$ |
| Tetramethylrhodamine | 0.20 | 17553 | 0.271 | 20277 | $4.3^b$ |
| Coumarin-102 | 0.66 | 14388 | 0.754 | 17807 | — |
| Cyanine 3 | 0.15 | 18000 | 0.108 | 11502 | $1.4^a$ |
| Cyanine 5 | 0.27 | 37260 | 0.456 | 51000 | $1.3^d$ |

[a] On irradiation of 3 µM dye solutions with 532-nm laser light (1.3 W, 10 Hz) of a Nd-YAG laser.
[b] On irradiation of 10 nM dye solutions with 514-nm laser light (30 mW, cw) of a Ar/2 laser in fluorescence correlation spectroscopy (FCS, Carl Zeiss LSM 510 Confocor 2) after 35 minutes, quantified via photon count rate.
[c] On irradiation of 10 nM dye solutions with 514-nm laser light (30 mW, cw) of a Ar/2 laser in fluorescence correlation spectroscopy (FCS, Carl Zeiss LSM 510 Confocor 2) after 5 minutes.
[d] On irradiation of 10 nM dye solutions with 633-nm laser light (6 mW, cw) of a He-Ne/2 laser in fluorescence correlation spectroscopy (FCS, Carl Zeiss LSM 510 Confocor 2) after 35 minutes.

FIG. 4 shows the decrease in the relative photon count rate of TMR solutions in the confocal fluorescence microscope (Modus fluorescence correlation spectroscopy) with (TMR-CB7) and without (TMR) stabilisation by cucurbit[7]uril. The photon count rate in samples containing cucurbit[7]uril fell during irradiation for 2000 seconds only to about 95%, while the proton count rate of the cucurbit[7]uril-free sample fell to about 25% of the initial value in the same time.

EXAMPLE 3

Effect on Photophysical Properties

Addition of cucurbiturils leads to the formation of complexes with fluorescent dyes, which have changed photophysical properties, see examples in Table 3.

TABLE 3

Effect of the addition of CB7 (1 mM) on the absorption and fluorescence maxima of selected fluorescent dyes

| | without CB7 | | with 1 mM CB7 | |
| --- | --- | --- | --- | --- |
| Fluorescent dye | $\lambda_{abs}^{max}$ | $\lambda_{em}^{max}$ | $\lambda_{abs}^{max}$ | $\lambda_{em}^{max}$ |
| Rhodamine 6G | 526.0 | 552.0 | 534.6 | 555.0 |
| Rhodamine 123 | 500.0 | 525.0 | 502.6 | 532.0 |
| Tetramethylrhodamine | 552.6 | 577.0 | 558.6 | 582.0 |
| Coumarin-102 | 392.6 | 489.0 | 404.6 | 476.0 |
| Cyanine 3 | 544.6 | 560.0 | 558.6 | 571.0 |
| Cyanine 5 | 642.0 | 660.0 | 642.2 | 657.0 |

EXAMPLE 4

Optical Storage Medium

Figure 5:
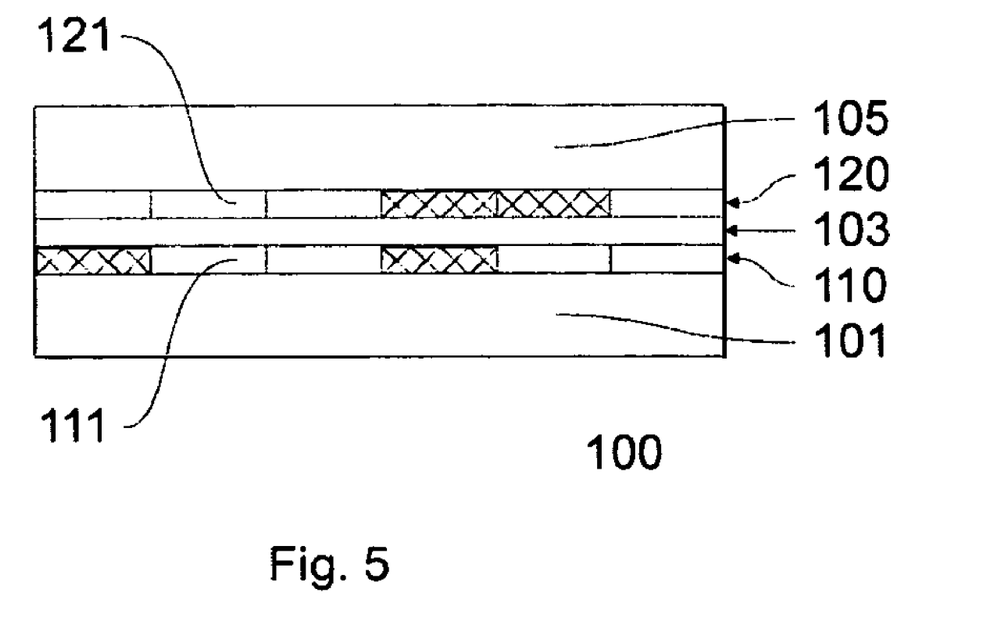

FIG. 5 shows an optical storage medium 100 according to the invention. The optical storage medium 100 has a solid carrier 101, a cover layer 105 and, between the carrier 101 and the cover layer 105, two storage layers 110, 120 for recording information. The storage layers 110, 120 are separated from one another by a separating layer 103.

The storage layers 110 and 120 each comprise storage sections 111 and 121, respectively. The storage sections 111, 121 each contain a fluorescent dye and cucurbituril, if the storage section 111, 121 in question is to be permanently fluorescent according to the information stored on the storage medium 100. The storage sections 111, 121 of the storage layers 110, 120 can be spaced from one another, in the plane of the storage layer 110, 120 in question, by sections that are not storage sections 111, 121. The reliability when writing and reading information to or from the optical storage medium is thereby improved.

The separating layer 103 and the cover layer 105 are substantially permeable to radiation of the excitation and fluorescence wavelengths of the fluorescent dye in question.

For storage (writing) of information, a corresponding storage section 111, 121 is first chosen. In this storage section, the fluorescent dye and/or the cucurbituril is destroyed completely or partially or is not destroyed, according to the information to be stored and the coding scheme. In particular, the fluorescent dye can be destroyed by irradiation with very strong light of the excitation wavelength in question. There is accordingly formed on the storage medium 100 a pattern of storage sections 111, 121, the fluorescence intensity of which is of varying permanence or strength according to the stored information.

For reading the information, a storage section 111, 121 is irradiated with light of the excitation wavelength of the particular fluorescent dye expected in the storage section 111, 121. According to whether the fluorescent dye is present in the storage section, and optionally whether the fluorescent dye is photostabilised by cucurbituril, a fluorescence signal corresponding to the stored information is produced by the irradiation. The fluorescence signal is measured and the storage information is reconstructed on the basis of the fluorescence signal.

The person skilled in the art will understand that it is possible for the storage medium to possess not simply two storage layers 110, 120 but also, for example, a single storage layer 110 or 120 or three or more storage layers. In addition, the one, two, three or more storage layers can contain more than one fluorescent dye, it being particularly preferred for each storage layer to contain a fluorescent dye whose excitation and emission wavelength is different from the excitation and emission wavelengths of fluorescent dyes in other storage layers. In this manner, selection of the storage layer to be inscribed and read is advantageously simplified.

The invention claimed is:

1. A method for improving the photostability and/or for improving the storage stability of a fluorescent dye comprising contacting the fluorescent dye with cucurbituril, wherein the fluorescent dye is selected from the group consisting of fluorescent dyes having a molecular weight of from 200 to 1000 g/mol., xanthene fluorescent dyes, cyanine fluorescent dyes, oxazine fluorescent dyes and coumarin fluorescent dyes or a mixture containing two or more of these dyes.

2. The method according to claim 1, wherein the cucurbituril is selected from the group consisting of cucurbit[5]uril, cucurbit[6]uril, cucurbit[7]uril and cucurbit[8]uril or a mixture of two or more of these cucurbiturils.

3. A photostabilised dye product containing a fluorescent dye and a cucurbituril in a concentration effective to achieve photo stabilisation of the fluorescent dye, wherein the fluorescent dye is selected from the group consisting of fluorescent dyes having a molecular weight of from 200 to 1000 g/mol., xanthene fluorescent dyes, cyanine fluorescent dyes, oxazine fluorescent dyes and coumarin fluorescent dyes or a mixture containing two or more of these dyes.

4. The dye product according to claim 3, wherein the concentration of the fluorescent dye is at least 100 pM and the concentration of the cucurbituril is at least 1 pM.

5. The dye product according to claim 3, wherein the dye product is selected from the group consisting of:
a laser dye solution for a dye laser, a reference solution for spectroscopic purposes, an optical storage medium and/or a display medium.

6. A dye laser containing a dye product according to claim 3.

7. An optical storage medium for the storage of data comprising:
a) a solid carrier, and
b) a storage layer for recording and reproducing information, the storage layer comprising storage sections, and the storage sections containing a fluorescent dye and a cucurbituril in a concentration effective to achieve photostabilisation of the fluorescent dye, wherein the fluorescent dye is selected from the group consisting of fluorescent dyes having a molecular weight of from 200 to 1000 g/mol., xanthene fluorescent dyes, cyanine fluorescent dyes, oxazine fluorescent dyes and coumarin fluorescent dyes or a mixture containing two or more of these dyes.

8. A display device comprising
a) a display surface having display sections, the display sections containing a fluorescent dye and a cucurbituril in a concentration effective to achieve photostabilisation of the fluorescent dye,
b) irradiating means for irradiating a chosen display section with a radiation intensity sufficient for triggering a fluorescence signal, and
c) a control device that is in active communication with the irradiating means in order to control the irradiating means in such a manner that display sections are irradiated or are not irradiated according to image information read in by the control device, in order to produce on the display surface a fluorescent image corresponding to the image information, wherein the fluorescent dye is selected from the group consisting of fluorescent dyes having a molecular weight of from 200 to 1000 g/mol., xanthene fluorescent dyes, cyanine fluorescent dyes, oxazine fluorescent dyes and coumarin fluorescent dyes or a mixture containing two or more of these dyes.

9. A storage device comprising
a) a storage surface having storage sections, the storage sections containing a fluorescent dye and a cucurbituril in a concentration effective to achieve photostabilisation of the fluorescent dye, and
b) irradiating means for irradiating a chosen storage section with a radiation intensity effective to trigger a fluorescence signal, wherein the fluorescent dye is selected from the group consisting of fluorescent dyes having a molecular weight of from 200 to 1000 g/mol., xanthene fluorescent dyes, cyanine fluorescent dyes, oxazine fluorescent dyes and coumarin fluorescent dyes or a mixture containing two or more of these dyes.

10. A process for inscribing an optical storage medium with a dye product, comprising the following steps:
a) information to be stored is read in
b) fluorescent dye and/or cucurbituril is destroyed in storage sections chosen according to the information to be stored, to produce an arrangement of storage sections having the ability, according to the information to be stored, to emit a fluorescent signal, wherein the dye product is a photostabilised dye product containing a fluorescent dye and a cucurbituril in a concentration effective to achieve photostabilisation of the fluorescent dye, wherein the fluorescent dye is selected from the group consisting of fluorescent dyes having a molecular weight of from 200 to 1000 g/mol., xanthene fluorescent dyes, cyanine fluorescent dyes, oxazine fluorescent dyes and coumarin fluorescent dyes or a mixture containing two or more of these dyes, and wherein the dye product is selected from the group consisting of a laser dye solution for a dye laser, a reference solution for spectroscopic purposes, an optical storage medium and/or a display medium.

* * * * *